United States Patent [19]
Fujita et al.

[11] Patent Number: 5,124,567
[45] Date of Patent: Jun. 23, 1992

[54] POWER SUPPLY DEVICE AND ELECTRONIC APPARATUS USING THE SAME

[75] Inventors: Yuzuru Fujita; Bunichi Fujita, both of Hadano, Japan

[73] Assignees: Hitachi, Ltd.; Hitachi Microcomputer System, Ltd., both of Tokyo, Japan

[21] Appl. No.: 603,283

[22] Filed: Oct. 25, 1990

[30] Foreign Application Priority Data

Oct. 26, 1989 [JP] Japan ................... 1-279120

[51] Int. Cl.⁵ ............................................. H02B 1/00
[52] U.S. Cl. .................................... 307/147; 307/89; 307/149; 333/12; 361/341; 363/39
[58] Field of Search ................. 333/12, 181; 361/341, 361/361, 390, 424; 307/89, 147, 148, 149; 363/39

[56] References Cited

U.S. PATENT DOCUMENTS

| | | | |
|---|---|---|---|
| 4,262,328 | 4/1981 | Bloom et al. | 333/181 |
| 4,342,013 | 7/1982 | Kallman | 333/181 |
| 4,355,352 | 10/1982 | Bloom et al. | 363/16 |
| 4,888,675 | 12/1989 | Kumar et al. | 333/181 |

FOREIGN PATENT DOCUMENTS 1-120098  5/1989  Japan .

*Primary Examiner*—Jeffrey A. Gaffin
*Attorney, Agent, or Firm*—Fay, Sharpe, Beall, Fagan, Minnich & McKee

[57] ABSTRACT

A power supply device has its power supply conductor bars, in which a.c. currents caused by a.c. noises flow in the same direction, laid closely in parallel while retaining their insulation thereby to increase the total inductance so that the impedance increases without accompanied by an increase in the d.c. resistance of the power supply conductor bars. An increased coupling impedance of the power supply conductor bars effectively attenuates the a.c. noises from d.c. power units, which then supply d.c. power with reduced a.c. noises to an electronic apparatus such as a computer through the power supply device.

8 Claims, 2 Drawing Sheets

POWER SUPPLY DEVICE AND ELECTRONIC APPARATUS USING THE SAME

BACKGROUND OF THE INVENTION

The invention relates to a power supply device and an electronic apparatus using the same, and particularly to a power supply device which transmits large d.c. power and to a technique which is useful when applied to an electronic apparatus using this power supply device.

Such an electronic apparatus as a general purpose computer consumes a great deal of electric power, with its supply current ranging as large as several hundreds to several thousands amperes.

A technique for reducing the voltage drop on the current path between a d.c. power unit and a load, which is composed of power supply copper bars having a large current conducting capacity, is to decrease the length and increase the cross-sectional area of the copper bars, as disclosed in Japanese Patent Unexamined Publication No. 1-120098.

A method for reducing an a.c. noise which is propagated from a power unit to a load is generally known, as described in publication "Counter-Noise Measures for Electronic Equipment", pp. 82–85, published on Jun. 30, 1986 by Ohm Corp. In FIG. 3, the method is intended for a power supply circuit 103 in which a power source 101 which creates an a.c. noise voltage supplies power to a load 102 through a coupling impedance Zm, and an additional coupling impedance Zg being added in series to the Zm so as to increase the coupling impedance of the circuit 103, and also a bypass impedance Zb being added in parallel to the load 102 of the circuit 103 so as to reduce the a.c. noise that acts on the load 102.

SUMMARY OF THE INVENTION

However, although the above-mentioned conventional technique based on the power supply copper bars with a reduced length and increased cross-sectional area is effective to reduce the voltage drop of d.c. power, the decreased impedance of the power supply copper bars causes an a.c. noise created in the d.c. power source to be propagated to the load without being attenuated, which can possibly induce a malfunctioning of an electronic component part in the load, as well as imposes a difficulty in the electronic circuit design in retaining the noise margin of the parts. Although it is conceivable to connect a number of bypass capacitors to the power circuit which consists of power supply copper bars in order to reduce the a.c. noise while minimizing the voltage drop of d.c. power, this measure confronts the recent trend of compactness of electronic apparatus.

Accordingly, it is an object of the invention to provide an electric power supply device capable of effectively reducing a.c. noises which are propagated from d.c. power units to a load through a power supply system formed of power supply copper bars or the like, without increasing the d.c. resistance of the power supply system.

Another object of this invention is to provide an electronic apparatus capable of enhancing the operational reliability of its electronic component parts which form the load, by effectively reducing a.c. noises which are propagated from d.c. power units to the load through a power supply system formed of power supply copper bars or the like, without increasing the d.c. resistance of the power supply system.

The power supply device of the present invention comprises a plurality of power supply conductor bars which connect at least one load to at least one d.c. power unit which generates or flows a.c. noises through itself, wherein all or part of the power supply conductor bars in which a.c. currents caused by the a.c. noises flow in the same direction, are laid closely in parallel while retaining their insulation.

The electronic apparatus using the power supply device described above comprises at least one load including electronic component parts, and at least one d.c. power unit connected to the load through a plurality of power supply conductor bars, the d.c. power unit generating or flowing a.c. noises through itself, wherein all or part of the power supply conductor bars in which a.c. currents caused by the a.c. noises flow in the same direction, are laid closely in parallel while retaining their insulation.

Generally, the impedance Z of a circuit is expressed in the complex representation as follows.

$$Z = R + jX \quad (1)$$

where the real part R is a d.c. resistance and the imaginary part X is a reactance.

When attention is paid only to the inductance L in the circuit, the reactance X is expressed in terms of the angular frequency w of the a.c. noise as follows.

$$X = \omega L \quad (2)$$

In order for the circuit to have the a.c. noise attenuation effect attributed to an increased impedance Z without incurring a power loss caused by the d.c. resistance R in the circuit, it is effective to increase the inductance L so that the impedance increases.

As described above, the power supply device has its all or part of the power supply conductor bars, in which a.c. currents caused by a.c. noises flow in the same direction, laid closely in parallel while retaining their insulation, whereby the coupling impedance of the power supply conductor bars can be made greater by increasing the total inductance of the power supply conductor bars so that the impedance increases without incurring an increase in the d.c. resistance of the power supply conductor bars. In consequence, it becomes possible to attenuate effectively the a.c. noises which are propagated from the d.c. power units to the load through the power supply conductor bars without incurring an increased loss of d.c. power.

The electronic apparatus has its all or part of the power supply conductor bars connected from d.c. power units to a load including electronic component the power supply conductor bars being laid closely in parallel while retaining their insulation, whereby the coupling impedance of the power supply conductor bars can be made greater by increasing the total inductance of the power supply conductor bars so that the impedance increases without incurring an increase in the d.c. resistance of the power supply conductor bars. In consequence, it becomes possible to attenuate surely the a.c. noises which are propagated from the d.c. power units to the electronic component parts in the load through the power supply conductor bars without incurring an increased loss of d.C. power.

As a result, the probability of malfunctioning of electronic component parts in the load caused by the a.c. noises coming from the d.c. power units through the power supply conductor bars decreases, and the reliability of operation of the electronic component parts in the load is enhanced.

The power supply conductor bars are assembled by being spaced out as narrow from each other as possible depending on the breakdown voltage which is determined from the operating voltage, or by being interleaved therebetween by insulators which are as thin as possible. In the former case, air naturally serves as insulator.

DESCRIPTION OF THE PREFERRED EMBODIMENT

The present invention will now be described with reference to the drawings.

Figure 1:
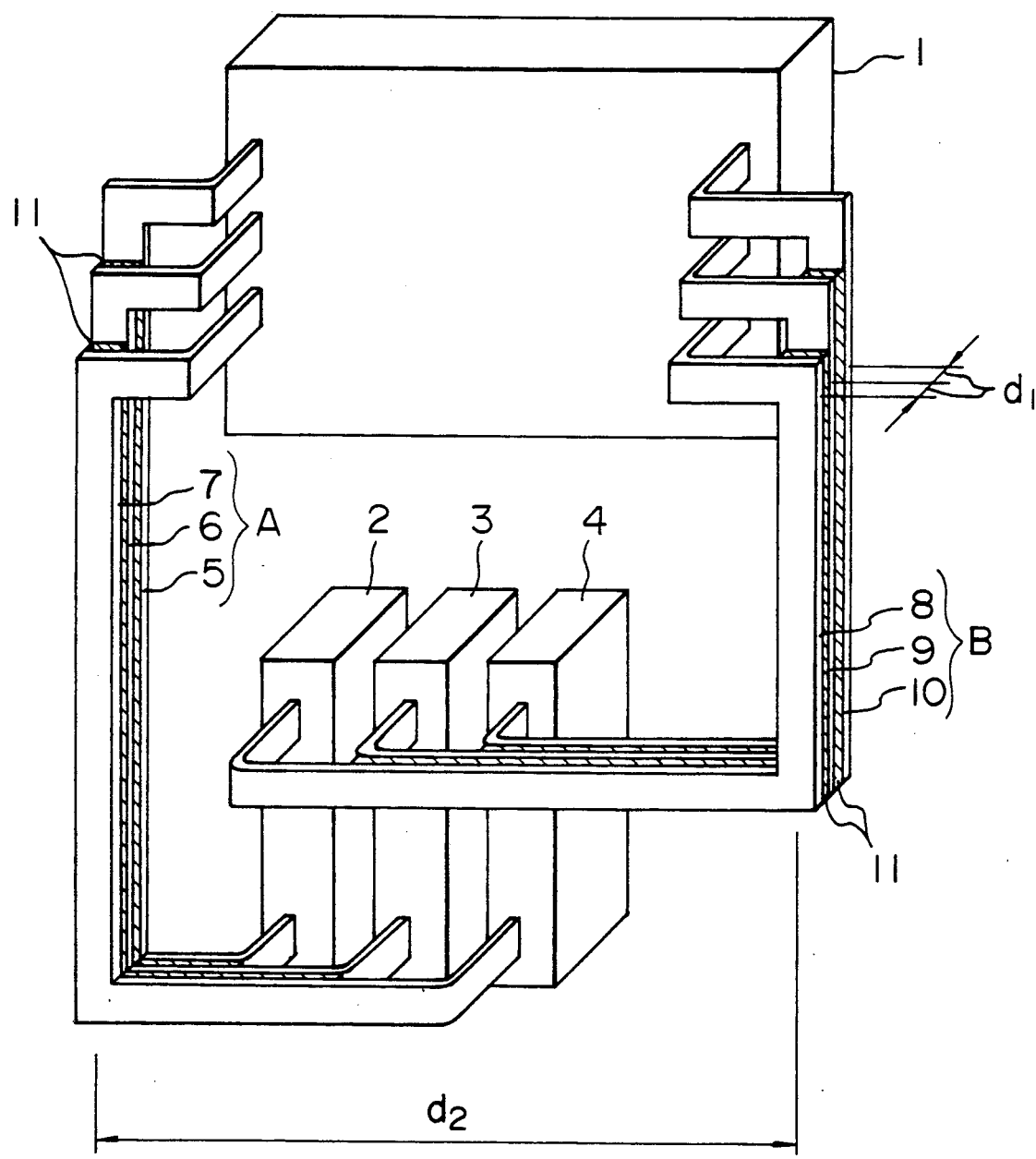
FIG. 1 is a perspective view of the power supply device and the principal portion of the electronic apparatus using the same in accordance with an embodiment of the invention.
Figure 2:
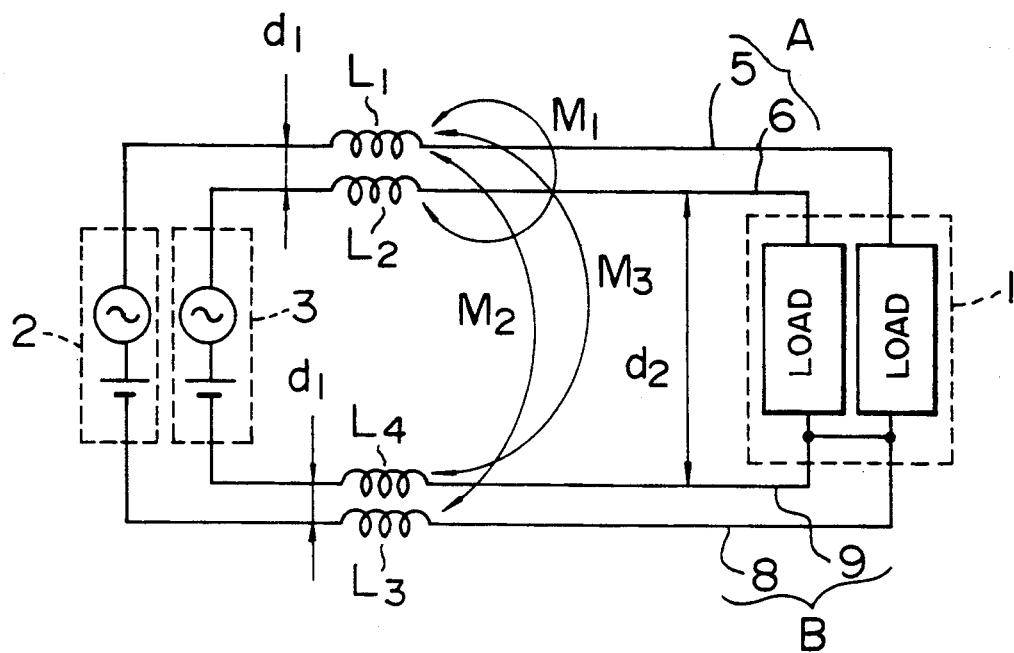
FIG. 2 is a diagram showing a circuit model of a power supply system.
Figure 3:
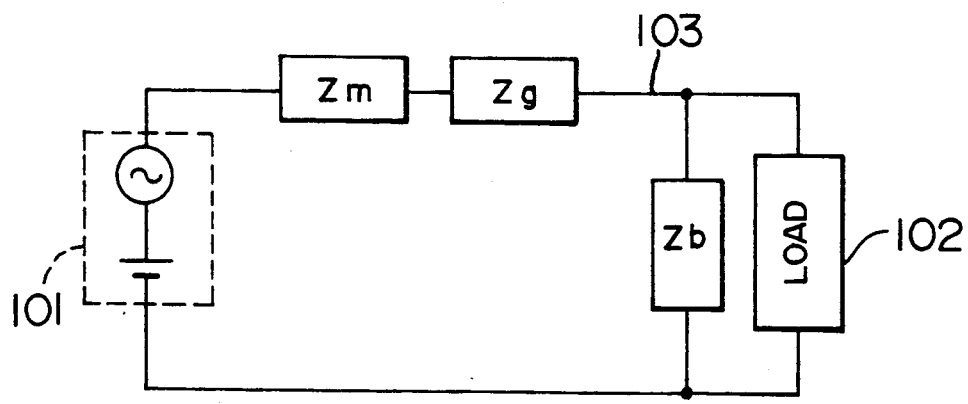
FIG. 3 is a diagram used to explain the conventional circuit arrangement for counteracting the a.c. noise.

FIG. 1 is a perspective diagram showing the power supply device and the principal portion of the electronic apparatus using the device, and FIG. 2 is an explanatory diagram showing a circuit model of the power supply system. A load 1 comprises, for example, part of a general-purpose computer system including large-scale logical integrated circuits, semiconductor memories, and other electronic component parts, and the load 1 is connected with a plurality of d.c. power units 2, 3 and 4 through a plurality of power supply conductor bars 5 to 10 made of copper so that it is supplied with d.c. power of three types of voltage.

The d.c. power units 2 to 4 produce d.c. power by rectifying a.c. power, which is supplied from the outside through diodes or the like (not shown). In this embodiment, a.c. power supplied to each of the d.c. power units 2 to 4 is controlled so that a.c. components or voltage ripples (a.c. noises) included in the d.c. power produced by the d.c. power units 2 to 4 are in-phase with one another.

The d.c. power units 2 to 4 have their "outgoing" power supply conductor bars 5 to 7 to the load 1 laminated through this insulation materials 11 to form a power supply conductor bar set A. The distance d1 between adjacent conductor bars is minimized within the allowance of the breakdown voltage of the insulation materials 11 which is determined from the voltage applied to the power supply conductor bars 5 to 7.

Similarly, the d.c. power units 2 to 4 have their "return" (0 volt) power supply conductor bars 8 to 10 to the load 1 laminated through thin insulation materials 11 to form a power supply conductor bar set B, and the distance between adjacent conductor bars is minimized within the allowance of the breakdown voltage of the insulation materials 11. The reason for the insulation among the "return" (0 volt) power supply conductor bars 8 to 10 is to eliminate a change in the 0-volt balance which is created by the flow of common currents.

The power supply conductor bar set A and the power supply conductor bar set B are disposed so that their distance d2 is as large as possible within the allowance of the layout of the load 1 and the d.c. power units 2 to 4.

Since the d.c. power units 2 to 4 create in-phase voltage ripples, as mentioned above, the power supply conductor bar set A formed of the power supply conductor bars 5 to 7 have ripple currents in the same direction, and the power supply conductor bar set B formed of the power supply conductor bars 8 to 10 have ripple currents in the same direction. The ripple currents of the power supply conductor bar sets A and B are opposite in direction from each other.

The operation of the power supply device and the electronic apparatus using it based on this embodiment will be explained.

FIG. 2 shows a circuit model for the power supply device of this embodiment. For the better understanding of explanation, the circuit model of FIG. 2 deals with only two sets of d.c. power units 2 and 3, power supply conductor bars 5 and 6, and power supply conductor bars 8 and 9, out of the full sets of d.C. power units 2 to 4, power supply conductor bars 5 to 7 and power supply conductor bars 8 to 10 connected to the load 1. The operation of another combination of d.c. power units, e.g., units 3 and 4, or units 4 and 2, and associated combination of power supply conductor bars is identical and the explanation is omitter for the sake of simplicity.

The power supply conductor bars 5, 6, 8 and 9 in attention are assumed to have self inductances L1, L2, L3 and L4. In this embodiment, the power supply conductor bars 5 and 6 in the power supply conductor bar set A are disposed closely to have as small distance d1 from each other as possible. Because of the in-phase a.c. noises (ripples) flowing in the power supply conductor bars 5 and 6, these bars have a large mutual inductance M1. This situation is also pertinent to the return power supply conductor bar set B made up of the power supply conductor bars 8 and 9.

The distance d2 between the power supply conductor bar sets A and B is set as large as possible in this embodiment, and therefore a self inductance L1 of the power supply conductor bar 5 in the bar set A and mutual inductances M2 and M3 between the power supply conductor bar 8 and 9 having self inductance L3 and L4, respectively, in the bar set B, become small value in comparison with the above-mentioned mutual inductance M1.

With attention being paid to the power supply conductor bar 5 having the self inductance L1, the inductance pertinent to it is given by the following formula, $$L = L1 \pm M1 \pm M2 \pm M3 \qquad (3)$$

The symbol "$\pm$" which precedes the mutual inductances M1, M2 and M3 in the formula (3) is fixed depending on the directions of a.c. noise currents in the power supply conductor bar 5 in attention and the power supply conductor bars 8 and 9, and it takes plus "+" when the a.c. noise currents have the same direction, or takes minus "−" when the currents have opposite directions.

The power system of this embodiment is controlled so that the a.c. noises (ripples) created by the d.c. power units 2 and 3 are in-phase with each other, therefore the power supply conductor bar 6 with the self inductance L2 has an a.c. noise current in the same direction as of the counterpart of the power supply conductor bar 5 in attention, while the remaining power supply conductor bars 8 and 9 have a a.c. noise currents opposite in direction to that of the conductor bar 5. Consequently, a total inductance L pertinent to the power supply conductor bar 5 is given by the following formula.

$$L = L1 + M1 - M2 - M3 \qquad (4)$$

As mentioned previously, in the power supply device of this embodiment, the value of mutual inductance Ml is large and the values of mutual inductances M2 and M3 are small relative to Ml, accordingly the total inductance L inclusive of the mutual inductances Ml to M3 of the power supply conductor bar 5 having the self inductance Ll has a large value.

Consequently, it becomes possible to increase the value of impedance Z by increasing the reactance X ($\omega$L), while leaving the d.c. resistance R of the impedance Z shown by the previous formulas (1) and (2) unchanged.

It means that the power supply conductor bar 5 can have an addition of a large coupling impedance Z without incurring an increased voltage drop which would emerge if the d.c. resistance R is increased, and a great a.c. noise attenuation effect can be accomplished without incurring a loss of d.c. power output. This situation of the power supply conductor bar 5 in attention is also pertinent to other power supply conductor bars 6 to 10.

In addition, the use of a material which is low in electrical resistance and high in relative permeability for the power supply conductor bars 5 to 10, a great a.c. noise attenuation effect can be attained. In consequence, the probability of malfunctioning of electronic component parts which form the load 1 of the electronic apparatus caused by a.c. noises coming from the d.c. power units 4 to 6 is surely lowered and the operational reliability of the electronic apparatus is enhanced. This is equivalent to providing a large noise margin for electronic component parts which form the load 1 of the electronic apparatus, allowing an increased latitude of design in constructing the electronic apparatus.

Moreover, the power supply device eliminates the need of such extra component parts as bypass capacitors and ferrite cores employed conventionally with the intention of enhancing the a.c. noise attenuation effect for the power supply conductor bars, allowing the reduction of layout space for the electronic apparatus as the load 1 and the d.c. power units 2 to 4, and thus contributing to the size reduction of the electronic apparatus.

Although in this embodiment the power supply conductor bars are interposed by insulators 11 as shown in FIG. 1, the conductor bars may be assembled with spacers which provide a prescribed spacing depending on the required breakdown voltage. In this case, air serves as insulator.

The present invention which has been explained in detail for a specific embodiment, is not confined to the foregoing embodiment, but various changes are possible without departing from its substantial matter. For example, the arrangement and spatial relation of the d.c. power units and the load are not limited to those shown in the above embodiment.

Although the foregoing embodiment does not employ such a conventional scheme as connecting bypass capacitors in parallel to the load thereby to attenuate the ripple, this technique may be adopted in conjunction.

The prime effectiveness achieved by the present invention is summarized as follows.

The power supply device comprises a plurality of power supply conductor bars which connected at least one load to at least one d.c. power unit which generates or flows a.c. noises through itself, in which all or part of the power supply conductor bars in which a.c. currents caused by the a.c. noises flow in the same direction, being laid closely in parallel while retaining their insulation thereby to increase the total inductance L of the power supply conductor bars so that their coupling impedance increases but without accompanied by an increase in the d.c. resistance R of the power supply conductor bars, whereby the a.c. noise propagated from the d.c. power unit to the load through the power supply conductor bars can be attenuated effectively without incurring an increased loss of d.c. power.

The electronic apparatus using the power supply device described above comprises at least one load including electronic component parts and at least one d.c. power unit connected to the load through a plurality of power supply conductor bars, the d.c. power unit generating and flowing a.c. noises through itself, in which all or part of the power supply conductor bars in which a.c. currents caused by the a.c. noises flow in the same direction, being laid closely in parallel while retaining their insulation thereby to increase the total inductance L of the power supply conductor bars so that their coupling impedance increases without accompanied by an increase in their d.C. resistance R, whereby the a.c. noise propagated from the d.c. power unit to the load through the power supply conductor bars can be attenuated surely without incurring an increased loss of d.c. power.

In consequence, the probability of malfunctioning of electronic component parts in the load caused by a.c. noises coming from the d.c. power unit through the power supply conductor bars is lowered and the operational reliability of the electronic component parts which form the load is enhanced.

What is claimed is:

1. A power supply device comprising a plurality of power supply conductor bars connected from at least one d.c. power unit to at least one load, the d.c. power unit generating or flowing a.c. noises through itself,,- wherein all or part of power supply conductor bars in which a.c. currents caused by the a.c. noises flow in the same direction, are laid closely in parallel while retaining the insulation between said conductor bars.

2. A power supply device according to claim 1, wherein said all or part of power supply conductor bars in which a.c. currents caused by the a.c. noises flow in opposite directions, are laid as far from each other as possible.

3. A power supply device according to claim 2, wherein an a.c. power supply to said d.c. power unit is controlled so that the a.c. noises in the d.c. power unit are in-phase with each other.

4. A power supply device according to claim 1, wherein an a.c. power supply to said d.c. power unit is controlled so that the a.c. noise in the d.c. power unit are in-phase with each other.

5. An electronic apparatus comprising at least one load including electronic component parts and at least on d.c. power unit connected to said load through a plurality of power supply conductor bars, the d.c. power unit generating or flowing a.c. noises through itself, wherein all or part of power supply conductor bars in which a.c. currents caused by the a.c. noises flow in the same direction, are laid closely in parallel while retaining the insulation between said conductor bars.

6. An electronic apparatus according to claim 5, wherein all or part of power supply conductor bars in which a.c. currents caused by the a.c. noises flow in opposite directions, are laid as far from each other as possible.

7. An electronic apparatus according to claim 5, wherein an a.c. power supply to said d.c. power unit is controlled so that the a.c. noises in the d.c. power unit are in-phase with each other.

8. An electronic apparatus according to claim 6, wherein an a.c. power supply to said d.c. power unit is controlled so that the a.c. noises in the d.c. power unit are in-phase with each other.

* * * * *